April 12, 1932. T. G. PLANT 1,853,079
MACHINE FOR SEEDING GOLF LINKS, LAWNS, AND THE LIKE
Filed Dec. 19, 1928 7 Sheets-Sheet 1

INVENTOR
Thomas G. Plant
BY Robt P Hains
ATTORNEY

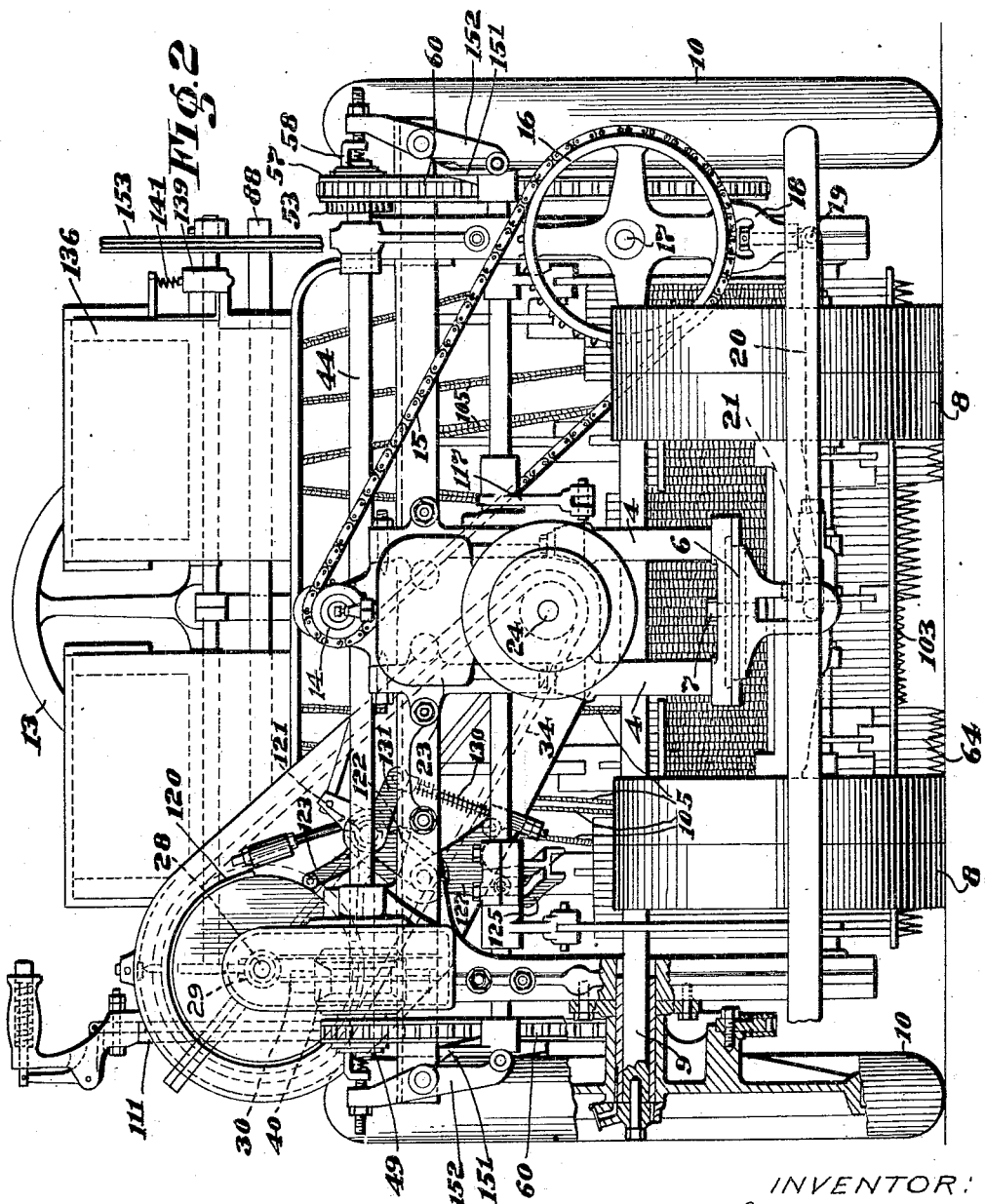

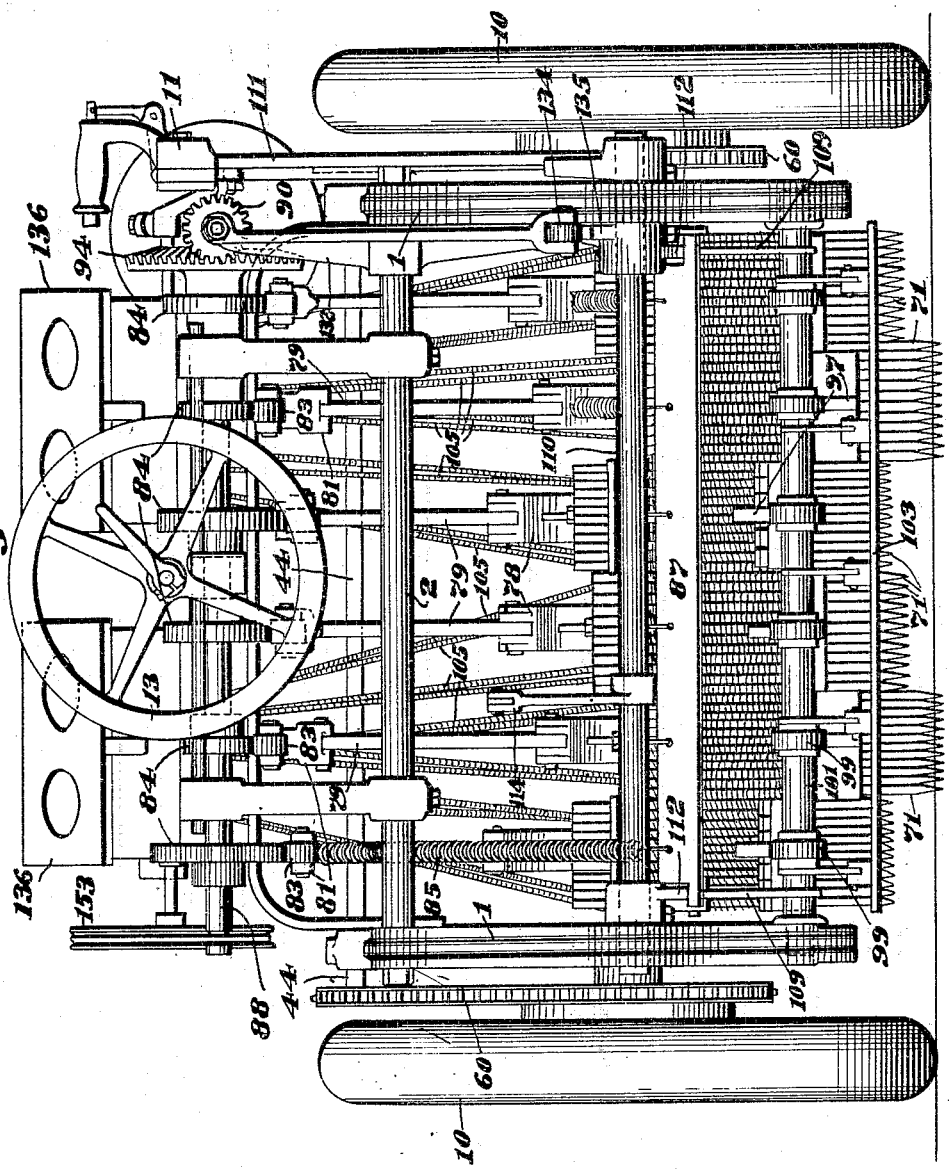

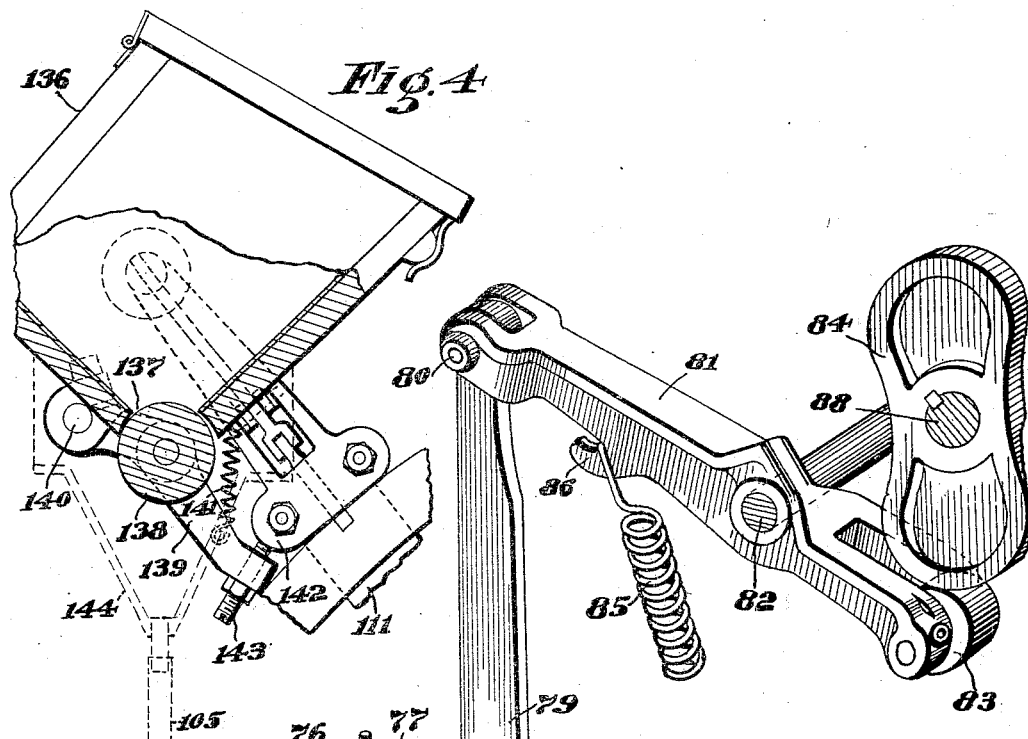
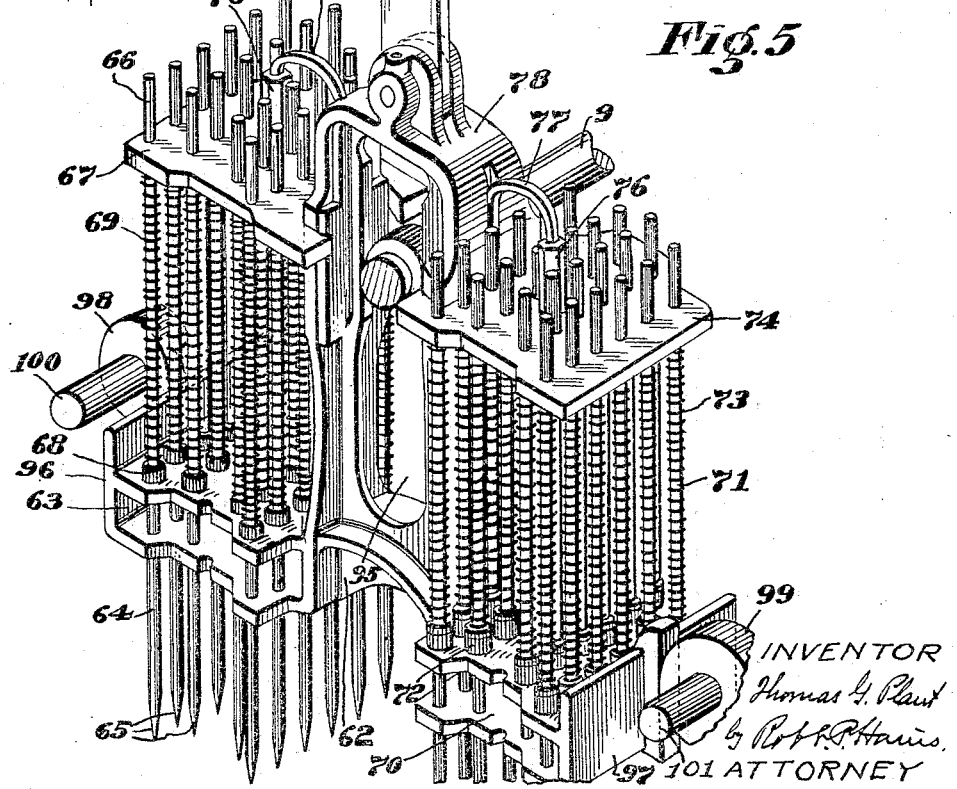

April 12, 1932.　　　T. G. PLANT　　　1,853,079
MACHINE FOR SEEDING GOLF LINKS, LAWNS, AND THE LIKE
Filed Dec. 19, 1928　　7 Sheets-Sheet 5
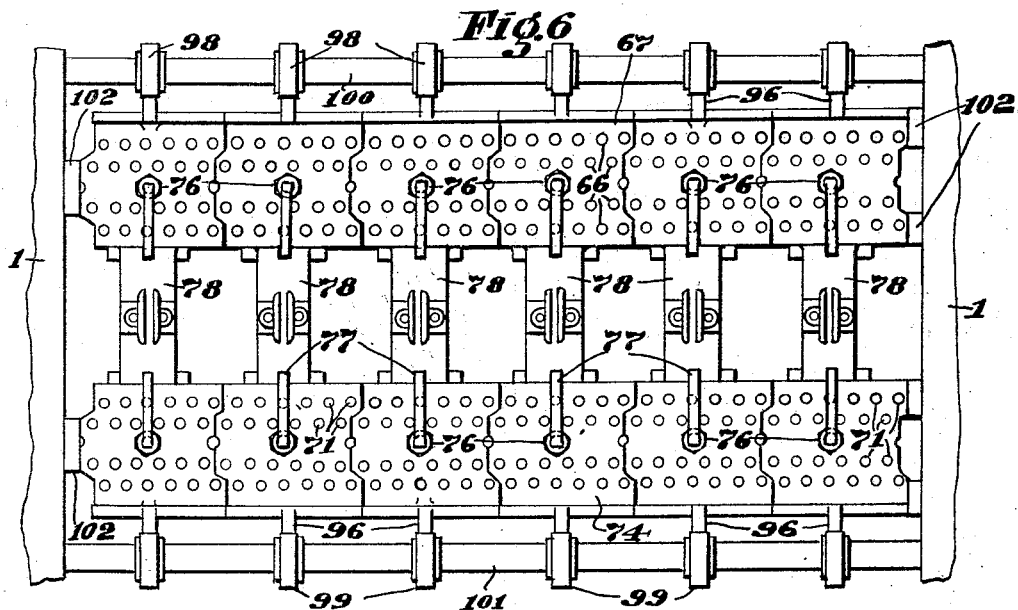
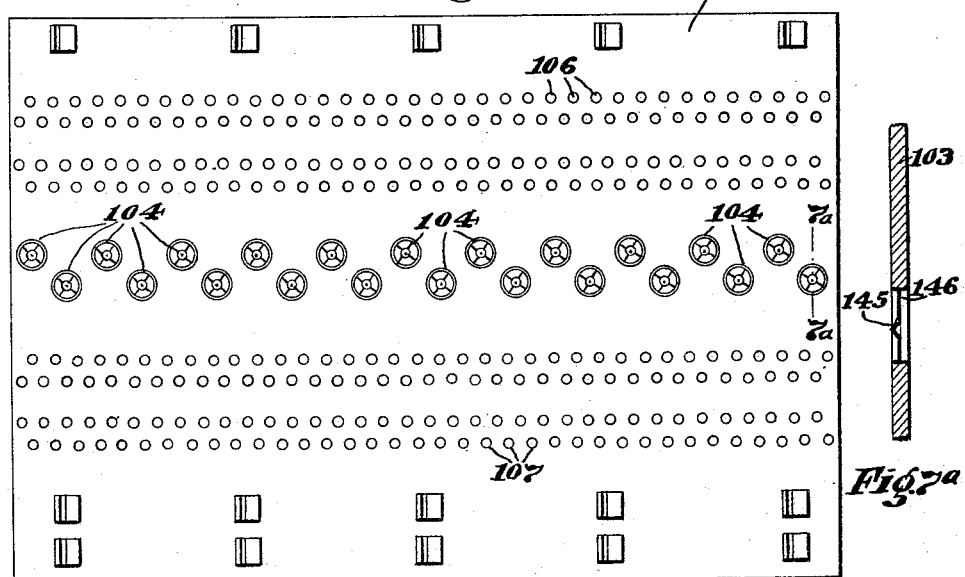
INVENTOR:
Thomas G. Plant
BY Rob't P. Hains
ATTORNEY April 12, 1932.　　　T. G. PLANT　　　1,853,079
MACHINE FOR SEEDING GOLF LINKS, LAWNS, AND THE LIKE
Filed Dec. 19, 1928　　　7 Sheets-Sheet 6
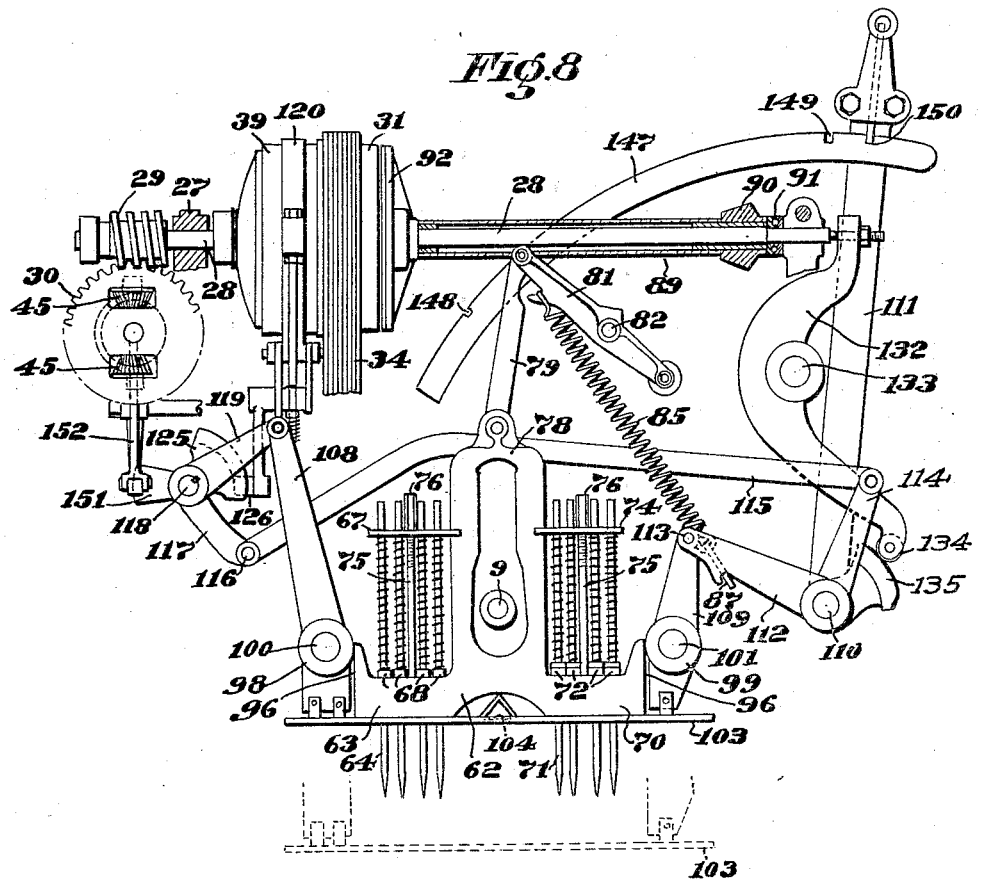
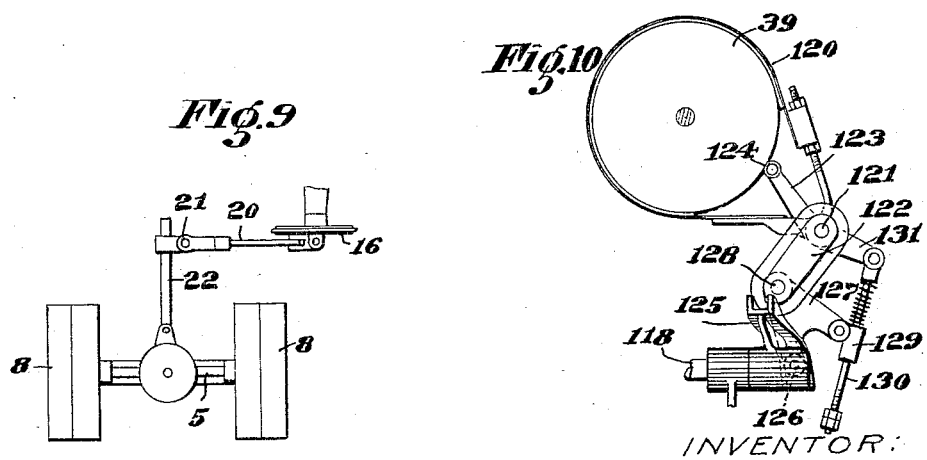

April 12, 1932. T. G. PLANT 1,853,079
MACHINE FOR SEEDING GOLF LINKS, LAWNS, AND THE LIKE
Filed Dec. 19, 1928 7 Sheets-Sheet 7
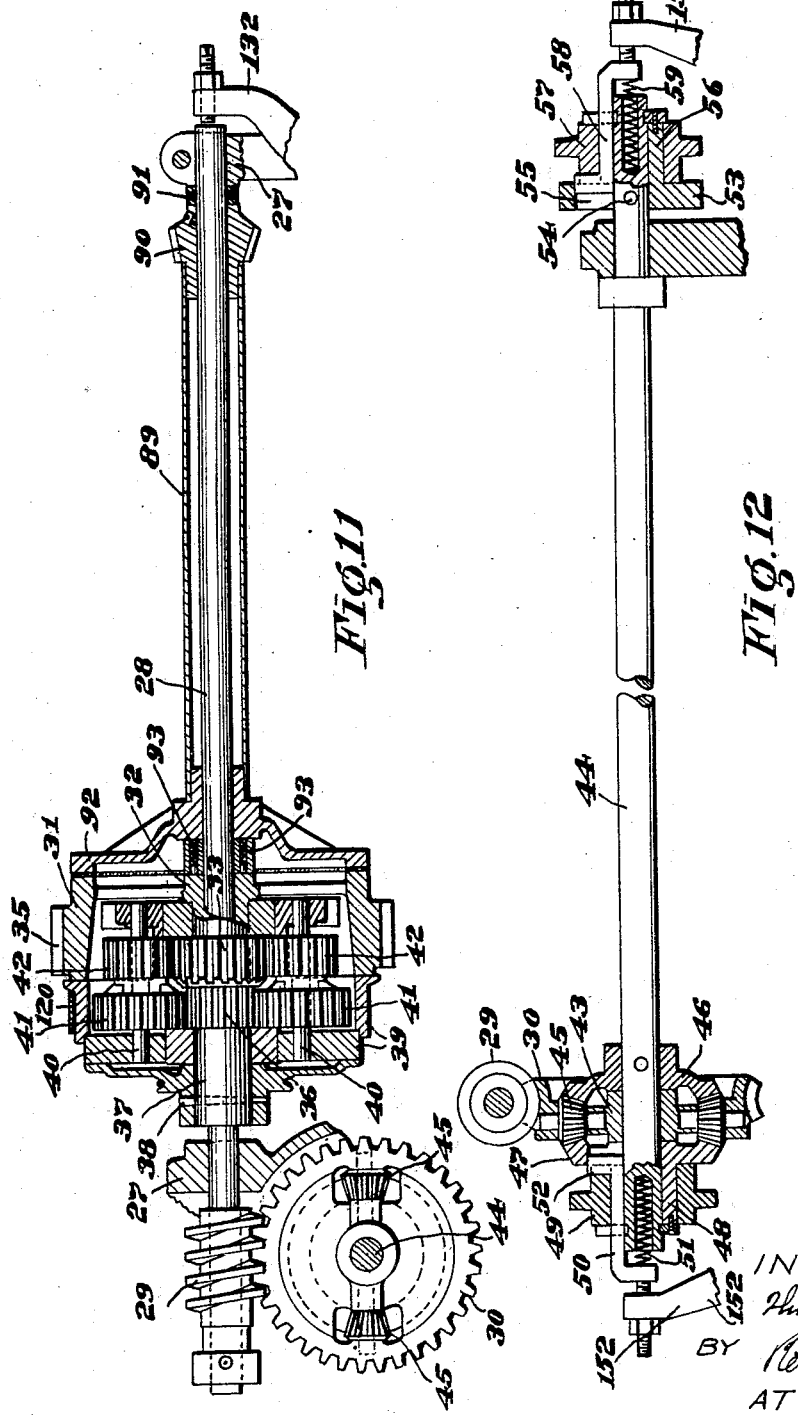

Patented Apr. 12, 1932

1,853,079

UNITED STATES PATENT OFFICE

THOMAS G. PLANT, OF MOULTONBORO, NEW HAMPSHIRE

MACHINE FOR SEEDING GOLF LINKS, LAWNS, AND THE LIKE

Application filed December 19, 1928. Serial No. 327,084.

This invention relates to a method of and machine for conditioning and grass seeding ground, and is more particularly directed to such a method and machine for the production and renovation of golf links, fairways, putting greens, lawns and the like.

Golf links are valued largely by the fine texture of the turf and uniform growth of grass, especially in the putting greens, fairways, and the like, and attempts have been made heretofore to secure an acceptable and uniform turf texture by manual efforts seeking to disintegrate the surface soil by harrow and hand rake, then scatter the grass seed over the soil, and, in a subsequent effort, hand rake the scattered seed and surface soil.

Grass seed of the fine character required to produce the desired fine turf texture is readily influenced by air currents and when scattered about is found to be deposited on the soil in irregular batches and amounts dependent upon the individual and wind conditions, with the result that when attempt is made to rake it into the soil only a small portion in irregular batches is covered so that when the grass comes up the irregularity of growth of grass will be manifested throughout the seeded area. The operations of hand raking the soil, scattering the seed and raking the seed into the soil are obviously not continuous, but, on the contrary, follow each other at separated intervals of time, with the further result that wind conditions may and usually do pile up and scatter the seed irregularly over the ground, thus emphasizing the irregularity of the growth of the resulting grass. Should rain fall before the seed is properly covered or takes root, the scattered seed will be washed from the higher to the lower portions of the seeded area leaving spots and areas entirely devoid of seed and growth of grass.

In the agricultural field it has been proposed heretofore to sow hay and grass seed upon the surface soil without attempting to work the seed into the soil, and in such cases of course the objections heretofore suggested with respect to hand or other seeding methods maintain, that is, the seed rests lightly upon the surface soil and is readily displaced by wind and rain. In other cases, as in sowing grain, a drilling or harrowing action is employed, either to form rows into which the seed is deposited and thereafter covered, or to cover the seed by a harrowing or plowing action. Obviously, these agricultural seeding conditions are entirely unsuited for use in seeding golf links, fairways, putting greens and grass lawns, wherein a smooth, even, undisturbed surface is desired, because when a drilling or harrowing action is employed to cover the seed, the hay or grass will appear in spaced rows, a condition quite unsuited for the purposes of the present invention.

In accordance with the method of the present invention, the ground to be grass seeded is first surface granulated or pulverized in place and fine grass seed is then uniformly broadcasted on to the granulated surface soil; the seed and granulated soil are then intermixed resulting in a light soil covering the seed, and immediately thereafter the mixed seed and soil are subjected to compression whereby the uniformly broadcasted seed and granulated surface soil remain relatively fixed and undisturbed by wind, rain or other natural conditions. The operations constituting the method of the present invention are carried on in continuous consecutive sequence, each operation following the other in the order stated.

The machine to be hereinafter described as constituting one practical embodiment of means for carrying the method into effect is characterized by a wheel-supported frame having mounted thereon a series of surface soil granulating or pulverizing devices, and in separated relation rearward thereof soil pulverizing and mixing devices for surface mixing the pulverized soil and seed, and seed broadcasting means between the two series stated, with the result that the soil is first granulated or pulverized, the seed uniformly broadcasted close to the surface of the granulated soil, and the broadcasted seed and granulated soil immediately thereafter being intermixed by the rear pulverizing and mixing devices. As a further characterizing feature of the machine of the present invention, the compression to which the mixed seed and granulated soil are subjected is conveniently carried into effect by means of a trailing roller which acts upon the intermixed granulated soil and seed immediately after the intermixture of the two.

From this general statement of the present invention, both as to the method and machine, it will be apparent that the surface soil or ground that has little or no growth of grass is not materially displaced but remains of the original, generally smooth, character, unfurrowed and even.

More specifically stated, the machine for carrying the method into effect is provided with means for imparting to the pulverizing or granulating devices a rapid up-and-down movement whereby the granulating or pulverizing devices act upon the surface soil in place, while the rear pulverizing and mixing devices for intermixing the broadcasted seed and granulated soil are likewise actuated by a train of mechanism for imparting rapid up-and-down movements thereto, the result being that the fine seed broadcasted between the granulating devices and surface mixing devices is intermixed with the granulated soil without the production of uneven or furrowed conditions.

During the conditioning and seeding operations it is desirable that the machine of the present invention be moved over the ground to be seated at a relatively slow speed and yet be susceptible of a higher advancing speed when the seeding operation has been concluded on any particular ground area, and to this end the machine of the present invention is provided with a motor and trains of mechanism actuated therefrom to advance the machine at slow speed during the seeding operation and when the seeding operation has been concluded on any particular area, and the granulating or pulverizing and mixing devices have been moved to their inoperative position under manual control, the machine will be advanced at higher speed.

The method of the present invention and the means for carrying it into practical effect, and novel features thereof, will best be made clear from the following description and the accompanying drawings of one good practical form of the invention.

In the drawings:

Fig. 2 is a front elevation of the machine, some of the parts being shown in section;

Fig. 3 is a rear elevation of the machine with the trailing roller omitted;

Fig. 4 is an enlarged detail with parts in section showing the seed hopper and associated parts;

Fig. 5 is a perspective view on an enlarged scale of one group of granulating or pulverizing devices and mixing devices and means for operating them;

Fig. 6 is a top plan view of the entire group of granulating and mixing devices showing more particularly the guiding means and manner of nesting these devices in groups;

Fig. 7 is a top plan view of the seed broadcasting plate;

Figure 1:
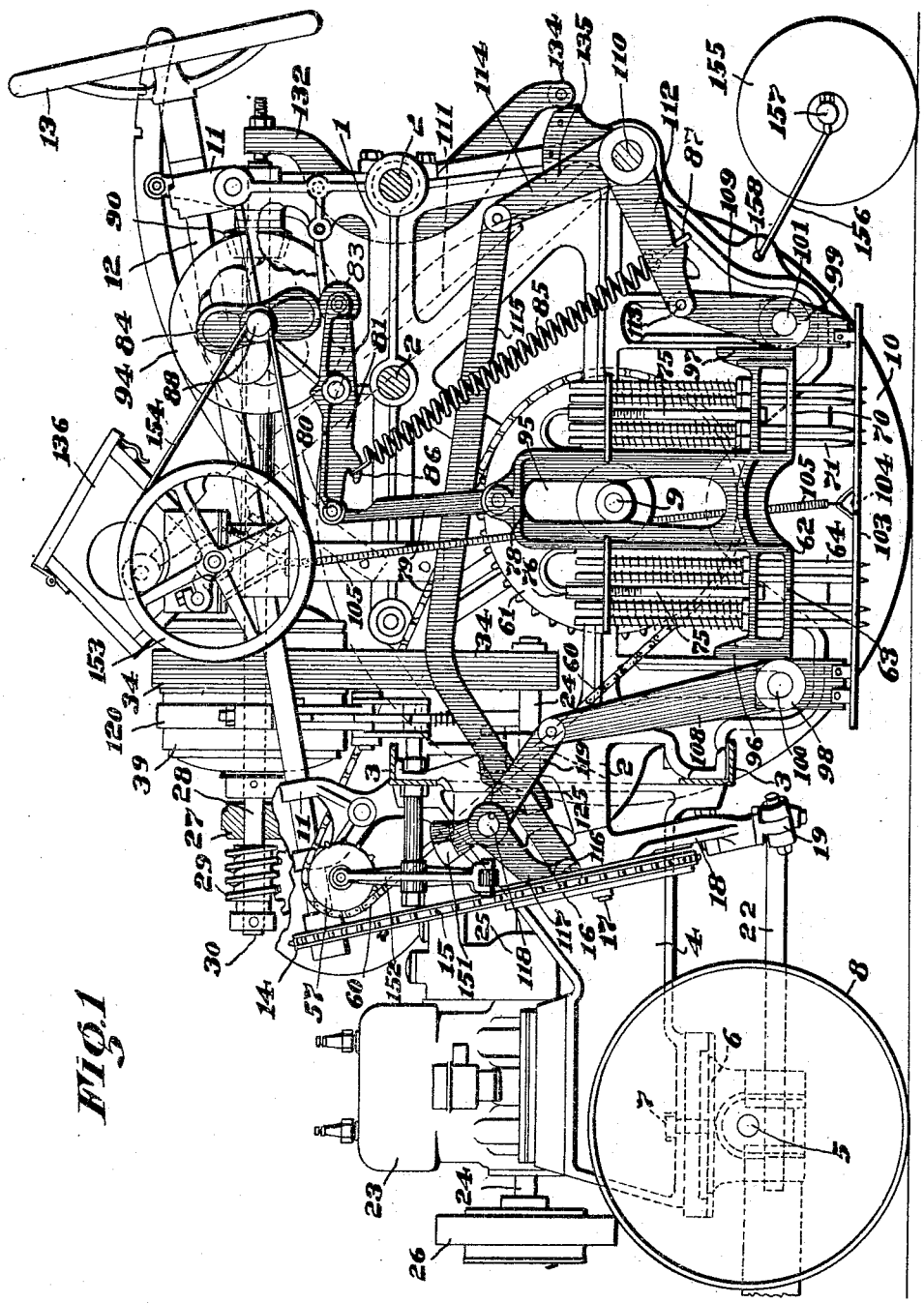
Fig. 1 is a side elevation of the complete machine containing the present invention, some of the parts being broken away for clearness of illustration.

Fig. 7—a is an enlarged section on the line 7—7 of Fig. 7, and showing more particularly one good form of means for broadcasting the seed as delivered from the hopper;

Fig. 8 is a detached side elevation with some of the parts in section, showing more particularly the manual control of the granulating and mixing devices;

Fig. 9 is a top plan view on a small scale of the front wheels of the machine frame and connected steering mechanism thereof;

Fig. 10 is a detached side elevation of mechanism for varying the speed at which the machine may be advanced;

Fig. 11 is a sectional elevation through the speed controlling mechanism; and

Fig. 12 is a detached view with parts in section showing clutch means for connecting and disconnecting the driving wheels with the motor.

In the embodiment of the invention shown the various operating parts of the conditioning and seeding machine are mounted upon a frame work or carriage that is adapted to travel over the ground by motor means mounted upon the carriage or frame work.

The frame of the machine may be variously constructed to appropriately support the operating parts and, as indicated in the present instance of the invention, it consists of side frames 1 connected by the cross-ties 2 and angle plates 3, Fig. 1, and extending frontward of the machine frame are the plates or castings 4, Figs. 1 and 2, to which the front axle 5 is connected by means of a fifth wheel 6 which may be secured to the front castings 4 by a pivot pin 7. Mounted on the front axle 5 are the front wheels 8 which are preferably formed of a width to impart no injurious influence to the ground over which the machine is traveled.

Extending between the side frames 2 and suitably journalled therein is the rear wheel shaft 9, Fig. 1, on which are mounted the rear wheels 10, of which there may be two, one at each side of the machine. The wheels 10 which support a large part of the weight of the machine may be suitably formed to prevent injury to the ground, as by having rubber tires mounted thereon, if desired.

Mounted in suitable brackets 11, preferably located at the upper portion of the machine, is the steering shaft 12 having a steering wheel 13 in convenient position for manipulation by the machine attendant, and a sprocket wheel 14 at its opposite end. Passing about the sprocket wheel 14 is the sprocket chain 15 which encircles a sprocket wheel 16 mounted for rotative movement upon a pin 17 extending from one of the frames 2 at one side of the machine, and secured to the sprocket wheel 16 is the downwardly extending arm 18 which is connected at its lower end at 19 to a link 20 projecting laterally from the arm 18 and connected at its opposite end by the pivot 21, Fig. 9, to a steering arm 22 operatively associated with the fifth wheel mechanism to change the direction of the machine as it is advanced. The supporting and steering mechanism for the machine may be variously contrived, but the above constitutes one good practical form of the invention in this respect.

Mounted up the frontward extension 4 of the machine frame is the motor 23, Fig. 1, which may be of suitable type, and connected to the motor is the motor shaft 24, mounted in suitable bearings, as at 25, and provided with a fly wheel 26. The motor actuation of the motor shaft 24 is utilized in accordance with the present invention to advance the machine as a whole and operate the various mechanisms carried thereby, as will further appear.

Mounted in suitable bearings 27 at the upper portion of the machine is the drive shaft 28 which is mounted for slight endwise movement, and on the forwardly extending end of the drive shaft 28 is a worm 29 which meshes with a worm wheel 30, the construction being such that upon rotative movement being imparted to the drive shaft 28, the worm wheel 30 will be given rotary movement. Loosely mounted upon the drive shaft 28 is the casing 31 having a hub portion 32 to which is secured a gear 33, and rotary movement is imparted to the casing 31 by a silent chain drive 34 between the motor shaft 24 and the sprocketed portion 35 of the casing 31. Secured to the drive shaft 28 is the gear 36 which may be conveniently mounted on the hub 37 secured to the shaft by a key 38. Mounted for rotative movement about the shaft 28 is the composite collar 39, the two parts of which rotate together, and extending from the collar 39 are the pins 40, each of which carries the differential gears 41 and 42, the former being in mesh with the fixed gear 36 and the latter with the gear 33 carried by the loose casing 31. The mechanism described is of the differential type such that on rotative movement of the loose casing 31, rotative movement will be imparted to the shaft 28 by the differential character or size of the gears 41 and 42 and the speed of rotation of the shaft will of course be governed by the freedom to rotary movement of the composite collar 39. That is to say, upon rotation of the loose casing 31 and unretarded rotation of the composite collar 39, the driving shaft 28 will be rotated at slow speed, but should the composite collar 39 be retarded in its rotative movement, the drive shaft 28 will be rotated at higher speed. The differential thus far described may be of any usual type and retardation of the rotative movement of one of the parts of the differential, such, for instance, as the composite collar 39, is controlled in accordance with the present invention to vary the speed of the drive shaft 28 and of course the mechanism driven thereby.

As hereinbefore stated, the worm wheel 30 is driven from the worm 29 and consequently partakes of the speed of rotation of the drive shaft 28.

The worm wheel 30 has a hub portion 43 loosely mounted on the traction shaft 44, Fig. 12, and carries the floating bevelled gears 45 which are disposed between the fixed bevel-gear 46 secured to the traction shaft 44 and the loose bevel-gear 47, constituting in effect a differential movement of generally well understood character.

The loose bevel-gear 47 has a hub portion 48 on which is loosely mounted the sprocket wheel 49 which may be clutched to and released from the bevel-gear 47 by movement of a clutch key 50 normally under the influence of a spring 51 to position the parts for locking engagement, as indicated at the left, Fig. 12. The clutch key 50 has its clutch portion 52 adapted to engage a suitable face recess in the loose sprocket wheel 49 under the influence of the spring 51, the construction being such that in the position shown by Fig. 12, the traction shaft 44 will be rotated, and, perforce, rotate the sprocket gear 49. At the opposite end of the traction shaft 44 is the clutch disk 53 secured to the shaft as by a pin 54 and having a clutch recess 55. Loosely mounted on the hub portion 56 of the clutch disk 53 is the sprocket wheel 57 which may be clutched to the clutch disk 53 by the key 58 under the influence of a spring 59, in a manner similar as described already for the opposite end of the shaft, Fig. 12.

About each of the sprocket wheels 49 and 57 passes a sprocket chain 60 connected to its associated driving wheel by a sprocket wheel 61, as more clearly indicated in Fig. 1, the construction being such that when the sprocket wheels 49 and 57 are in their clutch position, as indicated in Fig. 12, the machine as a whole will be advanced through the means already described. The mechanism described as an embodiment of this feature of the invention to propel the machine constitutes one good practical form of means to this end, but may be variously contrived to cause the machine to be advanced and at the sime time permit the main supporting wheels to rotate at different speeds as the machine is deflected from a straight course.

Mounted upon the machine frame are a series of surface soil pulverizers whose function is to disintegrate and granulate the soil without a substantial displacement thereof, whereupon the seed broadcasting means acts to distribute or broadcast the seed uniformly close to and on the granulated soil, and immediately thereafter the rear mixing devices serve to mix the broadcasted seed and granulated soil, and inasmuch as these functions and operations are carried on in sequence and in a continuous operation the present invention proposes to construct and associate the devices as will now be described.

Mounted upon the frame for up-and-down reciprocating movement is a head 62 having a front portion 63 on which are mounted a series or gang of granulating or pulverizing devices 64, shown in the present instance of the invention as being constituted as plungers arranged in staggered relation and under spring action to yield in case any of the plungers should strike an obstruction in the surface soil.

The front portion 63 of the head has a series of openings through which the granulating devices extend, and since each of the granulating devices is a duplicate of the other, a description of one will be sufficient for all. The granulating devices, as indicated more clearly on an enlarged scale in Fig. 5, are preferably formed with pointed ends 65 and having extended shank portions 66 projecting through openings in an adjustable plate 67, and between the plates 67 and collars 68 secured to each of the granulating plungers is a spring 69, the effect being that when the head 62 is reciprocated vertically, the granulating devices will be forced into the surface soil to effect granulation thereof without disturbing the even surface thereof, while at the same time should any one of the granulating devices strike an obstruction it would yield under the action of its associated spring.

The rear portion 70 of the head may be formed of substantially the same construction as described for the front or leading portion of the head, and mounted in the rear portion of the head are a series of mixing devices 71 which like the granulating devices may be formed as plungers and guided by the lower and upper plates of the head in a manner substantially the same as that for the granulating devices. Inasmuch as the mixing devices 71 are to effect a surface mixture of the broadcasted seed and the granulated soil, the mixing devices may act upon the soil to further pulverize it without penetrating to the same extent as the first set of granulating devices, and to this end each of the mixing devices 71 is provided with a collar 72 of substantial size to maintain the mixing device from penetrating the soil to as great an extent as the first set of granulating devices, and each of the devices is provided with spring means to premit yielding upward movement should any one of them strike an obstruction in the soil. The means to this end as herein shown consists of springs 73 interposed between the top plate 74 and the collar 72.

It may be desirable at times to adjust the tension of the springs of the granulating devices or the mixing devices, or both, so each of the top plates 67 and 74 are connected to the bottom plates by a threaded bolt 75 having a head 76 for turning the bolt, and a locking device 77 for holding the bolt in its adjusted position. These details may be varied between wide limits, the essential being that the granulating devices shall be arranged in groups and in staggered relation sufficiently close to effect granulation of the soil and yield under surface obstruction, and the same condition maintains with respect to the mixing and pulverizing devices 71.

While in the present illustration of the invention there are shown six groups of granulating and mixing pulverizers, the number of such groups may of course be varied, and different arrangements thereof may suggest themselves without departure from the spirit of the present invention.

Each of the heads 62, of which there may be any suitable number, is provided with a yoke 78 at its upper portion, to which is pivotally connected a link 79, the upper end of which is pivotally secured at 80 to an operating lever 81 pivotally mounted on the cross-shaft 82. The number of heads employed will of course dictate the number of levers for operating them.

Each of the levers 81 is provided with a roll 83 normally maintained in contact with its associated cam 84 by means of a spring 85, the upper end portion of which is connected to the lever 81 at 86 and the lower end of which is secured to the cross-bar 87, as indicated in Figs. 1 and 8.

The head actuating cams 84 are mounted upon the cam shaft 88 extending transversely of the machine and driven by a train of mechanism actuated from the driving shaft 28.

Referring more particularly to Fig. 8, the driving shaft 28, which has a slight endwise movement as hereinbefore stated, is surrounded by a sleeve 89 carrying a bevel-gear 90 and bearing against a thrust bearing 91. In order to effect rotative movement of the sleeve 89 and its connected bevel-gear 90, the sleeve has secured thereto a disk 92, Figs. 8 and 11, which is normally unclutched from the housing 31 by means of light springs 93, by which it may be clutched to and rotated with the housing 31 when slight endwise movement is imparted to the driving shaft 28 under the stress of the worm and worm wheel in driving the main supporting side wheels of the machine. The cam shaft 88 has a bevel-gear 94, Fig. 3, which engages the bevel-gear 90 on the sleeve 89, the construction being such that when the sleeve is rotated under the conditions above noted, the cam shaft will be actuated to turn the series of cams thereon and lift the head or heads connected to the respective operating levers, and such levers and perforce the head or heads will be lowered rapidly under the stress of the springs 85, thereby forcing the granulating and mixing pulverizers downwardly in the performance of their respective functions.

The reciprocating up and down movements of the head or heads 62 are controlled and guided by a slot 95 formed in the downwardly extending portion of the yoke 78 which embraces the wheel shaft 9, and each of the heads is provided with front and rear guide flanges 96 and 97, Figs. 1 and 5, which bear upon the adjacent rolls 98 and 99 mounted upon transverse shafts 100 and 101.

For the best results, the head carrying the granulating and the mixing devices should be given a very rapid reciprocating movement to thereby insure granulation of the soil in place and a proper mixing of the broadcasted seed and granulated soil, and while the means hereinbefore described constitutes a good form of this feature of the invention, it is to be understood, of course, that the details thereof may be varied indefinitely.

Where a number of gangs of granulating and mixing pulverizer tools are employed in associated relation transversely of the machine, and regardless of the number employed, they may be nested for relative reciprocation and guided as indicated in Fig. 6, wherein it will be noted that each of the heads has interengaging edge portions with the adjacent head, while the end member of the gang of tools is guided by guide strips 102.

In accordance with the method and machine of the present invention, the fine grass seed is to be broadcasted upon the granulated soil immediately after its granulation, after which the seed is to be intermixed with the granulated soil by the described devices, and in order to broadcast the seed between the two sets of devices, the present invention provides a broadcasting plate 103 having broadcasting openings 104, Figs. 1 and 7, disposed between the sets of granulating devices and the mixing devices. Seed is supplied to the broadcasting plate and openings 104 therein by suitable conduits from a seed hopper, and since the broadcasting plate is to be raised and lowered at times, the conduits between the hopper and broadcasting plate are preferably composed of yielding members 105 which may be formed as hollow springs, as indicated in Figs. 1 and 3.

The broadcasting plate 103 is preferably extended fore and aft beyond the granulating and the mixing devices and, as indicated in Fig. 7, the broadcasting plate may be conveniently provided with a series of openings 106 frontward of the series of openings 107 at the rear of the broadcasting openings 104, to provide additional guiding means for the granulating and the mixing devices.

The broadcasting plate 103 is connected to links 108 and 109, Fig. 1, which carry the respective shafts 100 and 101 on which the guide rolls 98 and 99 are mounted.

As hereinbefore stated, the granulating and the mixing devices and the seed broadcasting plate are to be raised from their normally lowered operating position when the machine is to be moved to another area of ground to be conditioned and seeded, and such movement of these devices to their inoperative position is under manual control.

Secured to the transversely extending shaft 110 is the hand lever 111, and extending from the shaft 110 is the arm 112 pivotally connected to the link 109, as at 113. Extending at an angle to the arm 110 is a second arm 114, Figs. 1 and 8, to the upper end of which is pivotally connected the link 115, its remote end being pivotally connected at 116 to an arm 117 mounted on a shaft 118 and having rigid therewith the arm 119 pivotally connected to the upper end of the link 108, the construction being such that should the hand lever 111 be moved from the full line position indicated in Fig. 8 to the dotted line position indicated in Fig. 1, the granulating and the mixing devices and the broadcasting plate will be lowered to their operative position with the broadcasting plate closely adjacent to the ground to be seeded, the position of the latter being indicated by the dotted lines in Fig. 8. The upward and downward movement of the broadcasting plate 103 by the means hereinbefore described is utilized to raise the heads carrying the granulating and the mixing devices, a condition which is permitted by the fact that the operating levers 81 for the heads bear against the periphery of the associated operating cams 84.

Broadcasting the seed between the granulating and the mixing devices at a point close to the surface soil obviates any liability of the seed being disturbed by wind or air currents which prevail the greater part of the time during the seeding operation.

At the conclusion of the conditioning and seeding operation on any area of ground when the machine is to be moved to another area, the granulating and the mixing devices and the broadcasting plate are raised from their operative position, as indicated in Fig. 1, to their inoperative position, as indicated in Fig. 8, and inasmuch as the machine is to be moved by its own power at a higher speed when these devices are moved to their inoperative position, advantage is taken of the movement to inoperative position to increase the machine traction speed, which is done by applying to the composite collar 39 a retarding force which, as hereinbefore explained, causes the differential, indicated in Fig. 11, to turn the drive shaft 28 at increased speed.

Any suitable means may be employed for braking the composite collar, and one good form of means to this end is indicated in Fig. 10, on a small scale. Passing around the composite collar 39 is a strap or brake band 120, the ends of which are secured at 121 to a swinging link 122 from which projects an arm 123 having its end 124 bearing against the periphery of the composite collar 39, the construction being such that should the arm 123 be moved contra-clockwise, as indicated in Fig. 10, it will correspondingly move the link 122 outward, thereby tightening the brake band about the composite collar and retarding its movement.

In accordance with the present invention, the retarding force applied to the composite collar 39 is to be effected when the hand operating lever 111 is thrown from its forward position, as indicated in Fig. 8 where the conditioning and seeding devices are in their inoperative position, and to this end the shaft 118 has connected thereto a cam 125 in which runs a roll 126 mounted on a link 127 pivotally connected at 128 to the link 122. A sleeve 129 is connected to the arm 127, as indicated in Fig. 10, and slides upon a pin 130 connected at its upper end to an arm 131 rigid with the arm 123, the construction being such that upon movement of the hand lever rearwardly to its position as indicated in Fig. 8, the braking force will be applied to the composite collar 39, to thereby increase the traction speed of the machine as a whole.

When the machine is being moved to a different area to be seeded it is desirable to suspend the operation of the cam shaft 88 to the end that the granulating and the mixing devices shall not be reciprocated, and in accordance with the invention, movement of the hand lever 111 rearwardly is utilized.

As hereinbefore stated, the driving shaft 28 carrying the worm 29 has a slight longitudinal movement, and bearing upon the end of the driving shaft 28 is a lever 132 pivotally mounted at 133 on the machine frame, as indicated in Fig. 8. The lower end portion of the lever 132 is provided with a roll 134 which rides upon a cam 135 secured to the shaft 110, the cam being constructed to move the lower end of the lever 132 outwardly when the granulating and mixing devices are moved upwardly to their inoperative position, with the result that the driving shaft 28 is given a slight endwise movement sufficient to separate the clutching faces of the casing 31 on the shaft 28 from the clutch member or disk 92 of the hollow shaft or sleeve 98, thereby suspending operation of the cam shaft 88.

It is a further feature of the present invention that when the hand lever 111 is moved frontwardly or into the dotted line position indicated in Fig. 1, that the seed hopper may deliver seed to the broadcasting devices, but when moved from such forward position that the feed of the seed from the hopper shall cease.

Mounted at the top of the machine frame is the seed hopper 136 having an open bottom 137 below which is located a feed controlling roller 138 mounted upon an arm 139 pivoted at 140 at the side of the opening 137 and normally under the influence of a spring 141, which, when unrestricted in its action, serves to move the roller 138 and to close the opening 137 in the hopper.

The hand lever 111 is provided with an abutment portion 142 which is adapted to engage a stop or pin 143 carried by the arm 139 when the hand lever is thrown to its forward position, to thereby effect slow speed of the machine and operation of the conditioning and seedcasting devices. When, however, the hand lever 111 is thrown away from such forward position, it frees the arm 139 to the action of its spring 141, with the result that the supply of seed ceases.

The seed opening in the hopper is connected to the seed conduits 105 by a troughed upper portion 144 and when the roller 138 permits, the seed will fall into the conduits 105 and be conveyed to the broadcasting devices in the openings 104.

The broadcasting devices may be variously contrived but as indicated in Figs. 7 and 7—a, each of the openings 104 is provided with a central cone baffle 145 preferably situated central of the openings 104 and connected to the wall of the opening by spider arms 146, the effect being that as the seed is fed through the openings 104, the baffles 145 and radial arms 146 will effectively distribute and broadcast the seed over a desired area, it being understood that the openings 104, as indicated in Fig. 7, are staggered with relation to each other.

From the construction hereinbefore described, it will be apparent that the movement of the machine as a whole from one area to another, the operation of the conditioning and seeding devices, and the variation in speed, are all under the control of the single hand operated lever 111.

The lever 111, as indicated in Fig. 8, travels along an arcuate arm 147, and when moved to its frontward position to effect operation of the conditioning and seeding devices, it may be locked by a notch 148, and when moved to its rearward position it may be locked by a notch 149 to suspend the operation of the conditioning and seeding devices, while yet permitting the machine as a whole to travel at high speed from one area to another.

It is sometimes desirable to disconnect the main driving wheels of the machine from the actuating train of mechanism that the machine may be moved by manual or horse power, a condition which results when the hand lever 111, as indicated in Fig. 8, is moved to its extreme rear position and there locked by a notch 150. The means for effecting disconnection of the traction wheels from their operating mechanism consists of a wing cam 151 secured to the shaft 118, Fig. 8, which acts upon the lower end portions of the clutch disengaging levers 152, Fig. 12, the upper end portions of which engage the clutch keys 50 and 58, the construction being such that when the hand operating lever 111 is moved to its extreme front position, as indicated in Fig. 8, the sprocket wheels 49 and 57 which normally drive the traction wheels are disengaged or unclutched from the driving means and the machine can be moved by either manual effort or horse power from one place to another.

To insure a proper feed of seed from the hopper to the seed conduits and broadcasting devices, it may be desirable at times to cause rotative movement of the hopper roller 138, and to this end the shaft on which the roller 138 is mounted may be rotated by a belt wheel 153 driven from the camshaft 88 by means of a belt 154.

It is to be understood, of course, that the details of the means employed for carrying out the present invention, both as to method and mechanism, may be varied without departing from the true spirit of the invention as defined by the claims, the essential of which is that the surface soil to be conditioned and seeded shall be first granulated or pulverized in place and the fine grass seed at once broadcasted close to and upon the granulated or pulverized surface soil, and immediately thereafter mixed with the granulated soil, and subsequently pressed with the granulated soil to prevent disturbance due to the wind and other weather conditions, all of the operations being carried on consecutively and continuously as the machine is moved over the area to be conditioned and seeded. One good form of means for effecting compression of the broadcasted seed and granulated soil consists of a roller 155 which acts upon the mixed seed and soil immediately after the intermixture of the seed and soil. The roller 155 may be conveniently moved along with the machine by means of links 156 connected to the axles 157 of the roller and to suitable lugs 158 on the machine frame, as indicated in Fig. 1.

What is claimed is:

1. A machine for conditioning and grass-seeding fairways, putting greens, lawns and the like, comprising, in combination, a wheel-supported vehicle constructed and arranged to be moved over the ground, granulating devices mounted on the vehicle for granulating the surface soil to be seeded, grass seed broadcasting means carried by the vehicle rearward of the granulating devices for depositing grass seed uniformly upon the granulated surface, and mixing devices rearward of the broadcasting means for mixing the seed and granulated surface soil to cover the seed with a light covering while maintaining the uniform distribution of the seed, said devices first acting to granulate the surface soil, then to broadcast seed thereon, and then to further pulverize the surface soil and mix the broadcasted seed with the granulated surface soil in a continuous operation as the vehicle is moved over the ground, and motor actuated means mounted on the vehicle for imparting granulating or mixing movements to said devices.

2. A machine for conditioning and grass-seeding fairways, putting greens, lawns and the like, comprising, in combination, a wheel-supported vehicle constructed and arranged to be moved over the ground, granulating devices mounted on the vehicle for granulating the surface soil to be seeded, grass seed broadcasting means carried by the vehicle rearward of the granulating devices for depositing grass seed uniformly upon the granulated surface, mixing devices rearward of the broadcasting means for further pulverizing the surface soil and surface mixing the seed and granulated surface soil, and means for raising and lowering one of said devices for moving it rapidly into and out of engagement with the ground, said devices acting to first granulate the surface soil, then broadcast seed thereon, and then mix the broadcasted seed and the granulated surface soil in a continuous operation as the vehicle is moved over the ground.

3. A machine for conditioning and seeding fairways, putting greens, lawns, and the like, comprising a wheel supported frame adapted to be moved over the ground to be seeded, seed broadcasting means mounted on the frame for broadcasting seed uniformly close to the ground, surface soil granulating devices mounted on the frame to granulate the soil in advance of the broadcasting means, mechanism for rapidly reciprocating said devices and mixing devices mounted on the frame to further pulverize the soil and simultaneously mix the broadcasted seed and the granulated soil.

4. A machine for conditioning and seeding fairways, putting greens, lawns, and the like, comprising a wheel supported frame adapted to be moved over the ground to be seeded, seed broadcasting means mounted on the frame for broadcasting seed uniformly close to the ground, surface soil granulating devices mounted on the frame to granulate the soil in advance of the broadcasting means, mixing devices mounted on the frame to further pulverize the surface soil and simultaneously mix the broadcasting seed and the granulated soil, and mechanism for rapidly reciprocating said mixing devices.

5. A machine for conditioning and seeding fairways, putting greens, lawns, and the like, comprising, in combination, a wheel supported frame adapted to be moved over the ground to be seeded, seed broadcasting means mounted on the frame for scattering seed close to and uniformly upon the ground, reciprocating surface soil granulating devices mounted on the frame to granulate the surface soil in advance of the broadcasting means, and reciprocating mixing and pulverizing devices mounted on the frame rearward of the broadcasting means to mix the seed and the granulated soil, said devices acting during the progress of the machine over the ground to first granulate the surface soil, then broadcast seed thereon, and then mix the seed and the granulated surface soil.

6. A machine for conditioning and seeding fairways, putting greens, lawns, and the like, comprising, in combination, a wheel supported frame adapted to be moved over the ground to be seeded, seed broadcasting means mounted on the frame for scattering seed upon the ground, reciprocating surface granulating devices mounted on the frame to granulate the surface soil in advance of the broadcasting means, and mixing devices mounted on the frame rearward of the broadcasting means to further pulverize the soil and mix the seed and the granulated soil, said devices acting during the progress of the machine over the ground to first granulate the surface soil, then broadcast seed thereon, and then mix the seed and the granulated soil, and a trailing roller for rolling the mixed seed and granulated soil immediately after they have been mixed.

7. A machine for conditioning and seeding fairways, putting greens, lawns, and the like, comprising, in combination, a wheel supported frame adapted to be moved over the ground to be seeded, seed broadcasting means mounted on the frame for scattering seed uniformly close to and upon the ground, reciprocating surface granulating devices mounted on the frame to granulate the surface soil in advance of the broadcasting means, and reciprocating mixing and pulverizing devices mounted on the frame rearward of the broadcasting means to further pulverize the soil and mix the seed and the granulated soil, said devices acting during the progress of the machine over the ground to first granulate the surface soil, then broadcast seed thereon, and then mix the seed and the granulated soil, and a motor mounted on the wheel supported frame for imparting rapid reciprocating movements to the granulating and mixing devices.

8. A machine for conditioning and grass-seeding fairways, putting greens, lawns and the like, comprising, in combination a wheel supported frame adapted to be moved over the ground, a gang of granulating tools mounted on the frame, grass seed broadcasting means for broadcasting seed uniformly upon the granulated soil rearward of the gang of granulating tools, a gang of mixing tools rearward of the broadcasting means for further pulverizing the surface soil and mixing the seed and the granulated soil, a motor mounted upon the frame, and a train of mechanism actuated by the motor for rapidly reciprocating the gang of granulating and mixing tools up and down as the machine is moved over the ground to be conditioned and seeded.

9. A machine for conditioning and grass seeding fairways, putting greens, lawns and the like, comprising, in combination a wheel supported frame adapted to be moved over the ground, a gang of granulating tools mounted on the frame, grass seed broadcasting means for broadcasting seed upon the granulated soil rearward of the gang of granulating tools, a gang of mixing tools rearward of the broadcasting means for further pulverizing the surface soil and simultaneously mixing the seed and the granulated soil, a motor mounted upon the frame, a train of mechanism actuated by the motor for rapidly reciprocating the gang of granulating and mixing tools up and down as the machine is moved over the ground to be conditioned and seeded, and a roller connected to the machine to roll the mixed seed and granulated soil immediately after they are mixed.

10. A machine for conditioning and seeding ground for the production of grass fairways, putting greens, lawns and the like, comprising in combination, a carriage adapted to travel over the ground to be seeded and provided with a forward row of tools mounted for movement up and down in different groups and a rear row of tools mounted for movement up and down in different groups, means for broadcasting seed uniformly upon the ground between said forward and rear rows of tools, and means for moving said tools up and down during the movement of the carriage to cause the forward row of tools to pulverize the surface ground and the rear row of tools to further pulverize the ground and simultaneously mix the broadcasted seed and granulated surface soil.

11. A machine for conditioning and grass-seeding fairways, putting greens, lawns and the like, comprising, in combination, a wheel supported frame, a motor mounted on the frame, a series of surface soil granulating devices, a series of mixing devices rearward of the granulating devices, means between the two for broadcasting grass seed uniformly upon the granulated surface soil, means actuated by the motor for operating the granulating and the mixing devices and moving the machine, and manually controlling means for throwing the granulating and mixing devices out of action and causing the mechanism to be moved at increased speed when said devices are thrown out of action.

12. A machine for conditioning and grass-seeding fairways, putting greens, lawns and the like, comprising, in combination, a wheel supported frame, a motor mounted on the frame, a series of surface soil granulating devices, a series of mixing devices rearward of the granulating devices, means between the two for broadcasting grass seed uniformly upon the granulated surface soil, means actuated by the motor for reciprocating the granulating and mixing devices and moving the machine, and manually operated means for raising the granulating and mixing devices from their operative position and causing the machine to be moved at increased speed.

13. A machine for conditioning and grass-seeding fairways, putting greens, lawns and the like, comprising, in combination, a wheel supported frame, a motor mounted on the frame, a series of surface soil granulating devices, a series of mixing devices rearward of the granulating devices, means between the two for broadcasting grass seed uniformly upon the granulated surface soil, means actuated by the motor for operating the granulating and mixing devices and moving the machine, and manually operated means movable to a predetermined position to cause the granulating and mixing devices to be operated and the machine to be moved at slow speed, and movable to another position to throw the granulating and mixing devices out of action and cause the machine to be moved at increased speed, and movable to a third position to stop the machine.

14. A machine for conditioning and grass-seeding ground for the production of grass fairways, putting greens, lawns, and the like, comprising, in combination, a wheel supported frame, a series of granulating devices mounted on the frame, a series of mixing devices mounted on the frame rearward of the granulating devices, a seed broadcasting device between the two that seed may be broadcasted uniformly upon the granulated soil and mixed therewith, manual means for changing the position of the seed broadcasting device that the seed may be broadcasted between said two devices in such close proximity to the granulated soil that it is undisturbed by air currents during the broadcasting operation, a motor for operating the granulating and mixing devices, and a roller connected to the machine and trailing rearward of the mixing devices to roll the mixed seed and granulated soil.

15. A machine for conditioning and seeding ground, comprising a wheel supported frame adapted to be moved over the ground to be seeded, surface soil conditioning devices mounted on the frame to granulate the soil, seed broadcasting means upon the frame for depositing seed upon the conditioned soil, mixing devices mounted on the frame to further pulverize the surface soil and simultaneously mix the broadcasted seed and the granulated soil, and means for rapidly moving said mixing devices up and down to work the seed into the soil.

16. A machine for conditioning and seeding ground, comprising a wheel supported frame adapted to be moved over the ground to be seeded, surface soil conditioning devices mounted on the frame to granulate the soil, seed broadcasting means upon the frame for depositing seed upon the conditioned soil, mixing devices mounted on the frame to further pulverize the surface soil and simultaneously mix the broadcasted seed and the granulated soil, and a motor mounted upon the frame and operable to actuate said mixing devices and cause them to work the seed into the soil.

17. A machine for conditioning and seeding ground, comprising a wheel supported frame adapted to be moved over the ground to be seeded, surface soil conditioning devices mounted on the frame to granulate the soil, seed broadcasting means upon the frame for depositing seed upon the conditioned soil, mixing devices mounted on the frame to further pulverize the surface soil and simultaneously mix the broadcasted seed and the granulated soil, and means for actuating said mixing devices and cause them to work the seed into the soil.

18. A machine for seeding ground, comprising a wheel supported frame adapted to be moved over the ground to be seeded, seed broadcasting means upon the frame for depositing seed upon the ground, mixing devices mounted on the frame to pulverize the surface soil and simultaneously mix the broadcasted seed with the soil, and means for rapidly reciprocating the mixing devices to work the seed into the soil.

19. A machine for seeding ground, comprising a wheel supported frame adapted to be moved over the ground to be seeded, seed broadcasting means upon the frame for depositing seed upon the surface soil, surface soil pulverizing devices mounted on the frame to pulverize the surface soil and simultaneously mix the broadcasted seed with the soil without material displacement of the soil or seed to thereby cause the two to be uniformly distributed and mixed throughout the pulverized surface area, and a motor mounted upon said frame and adapted to rapidly move the ground pulverizing devices up and down to work the seed into the soil.

In testimony whereof, I have signed my name to this specification.

THOMAS G. PLANT.